(12) United States Patent
Zhang et al.

(10) Patent No.: US 12,324,371 B1
(45) Date of Patent: Jun. 10, 2025

(54) NAVIGATION METHOD AND SYSTEM FOR CATERPILLAR-TYPE AGRICULTURAL MACHINERY DURING LOSS OF NAVIGATION REAL-TIME KINEMATIC SIGNAL

(71) Applicant: Hainan University, Hainan (CN)

(72) Inventors: Jian Zhang, Hainan (CN); Yang Liu, Hainan (CN); Ranbing Yang, Hainan (CN); Huihui Wen, Hainan (CN); Yongfei Pan, Hainan (CN); Shiting Lv, Hainan (CN); Ang Zhao, Hainan (CN); Xinyu Guo, Hainan (CN); Hongfei Zhu, Hainan (CN); Zhuhe Shao, Hainan (CN); Yao Li, Hainan (CN)

(73) Assignee: Hainan University, Haikou (CN)

( * ) Notice: Subject to any disclaimer, the term of this patent is extended or adjusted under 35 U.S.C. 154(b) by 0 days.

(21) Appl. No.: 19/004,185

(22) Filed: Dec. 27, 2024

(30) Foreign Application Priority Data

Jan. 11, 2024 (CN) .......................... 202410043956.3

(51) Int. Cl.
*A01D 41/127* (2006.01)

(52) U.S. Cl.
CPC .................................. *A01D 41/127* (2013.01)

(58) Field of Classification Search
CPC ...................................................... A01D 41/127
See application file for complete search history.

(56) References Cited

U.S. PATENT DOCUMENTS

| | | | |
|---|---|---|---|
| 9,945,955 B2 * | 4/2018 | Cihlar | G01S 19/43 |
| 10,422,885 B2 * | 9/2019 | Dai | G01S 19/44 |
| 11,698,462 B1 * | 7/2023 | Archer | G01S 19/258 |
| | | | 342/14 |
| 2016/0238711 A1 * | 8/2016 | Matthews | G01S 19/24 |
| 2017/0300064 A1 * | 10/2017 | Wolters | A01B 69/008 |
| 2021/0255336 A1 * | 8/2021 | Noble | G01S 19/08 |
| 2022/0187475 A1 * | 6/2022 | Noble | G01S 19/04 |

(Continued)

FOREIGN PATENT DOCUMENTS

| | | |
|---|---|---|
| CN | 112050801 A | 12/2020 |
| CN | 114721375 A | 7/2022 |

OTHER PUBLICATIONS

Huang et al., Y. Research on Integrated Navigation System of Agricultural Machinery Based on RTK-BDS/INS, Google Scholar, MDPI, Agriculture 2022, Aug. 2022, pp. 1-14. (Year: 2022).*

*Primary Examiner* — Russell Frejd

(57) ABSTRACT

The present disclosure provides a navigation method and system for caterpillar-type agricultural machinery during loss of a navigation real-time kinematic (RTK) signal, falling within the technical field of vehicle navigation. The method includes the steps of: S1, acquiring operation parameter information about the caterpillar-type agricultural machinery before signal loss, and adjusting a state of the caterpillar-type agricultural machinery based on the operation parameter information; and S2, calculating an operation deviation amount after adjusting the state of the caterpillar-type agricultural machinery for a time t. In the present disclosure, deviation operation caused by signal loss during large-scale operation of agricultural machinery can be improved, and problems in regional scale planting can be prevented.

7 Claims, 4 Drawing Sheets

(56) References Cited

U.S. PATENT DOCUMENTS

2023/0195136 A1* 6/2023 Desai ................... A01B 79/005
                                                            701/50
2023/0393287 A1* 12/2023 Garin .................... G01S 19/396
2024/0138282 A1* 5/2024 Kubota ................ A01B 69/008

* cited by examiner

NAVIGATION METHOD AND SYSTEM FOR CATERPILLAR-TYPE AGRICULTURAL MACHINERY DURING LOSS OF NAVIGATION REAL-TIME KINEMATIC SIGNAL

CROSS-REFERENCE TO RELATED APPLICATION

This application claims priority of Chinese Patent Application No. 202410043956.3, filed on Jan. 11, 2024, the entire contents of which are incorporated herein by reference.

TECHNICAL FIELD

The present disclosure belongs to the technical field of vehicle navigation, and particularly relates to a navigation method and system for caterpillar-type agricultural machinery during loss of a navigation real-time kinematic (RTK) signal.

BACKGROUND

An agricultural machinery navigation system is composed of satellite navigation system, geographic information system, control unit, display and operation interface. Its importance lies in improving agricultural production efficiency and accuracy, achieving automatic navigation and travelling, improving operation accuracy and consistency, recording and analyzing operation data, and saving costs and resources.

At present, the traditional caterpillar-type agricultural machinery can perform route tracing operation when the RTK signal is good. However, in the process of unmanned control, due to the shielding or interference of other tall objects, the signal will be lost, and the travelling route of the agricultural machinery will deviate from the planned route or the agricultural machinery will stop directly, which seriously restricts the development and promotion of agricultural navigation technology. Therefore, it is urgent to solve this problem.

SUMMARY

The present disclosure provides a navigation method and system for caterpillar-type agricultural machinery during loss of a navigation RTK signal to overcome the deficiencies of the prior art. The position and state information after a signal of agricultural machinery is lost is obtained through internal calculation of a controller. When the route deviation occurs in a straight line travelling of the agricultural machinery, through system calculation, the advancing distance of the caterpillar-type agricultural machinery, the advancing speed of equipment before the known signal loss and the differential velocity of two wheels can be obtained in real time. According to the deviation route, the differential velocity between two caterpillar bands is controlled in real time by means of a velocity regulation system, to achieve that an operation route of the equipment matches the planned route.

In order to achieve the above object, the present disclosure provides the following technical solutions. A navigation method for caterpillar-type agricultural machinery during loss of a navigation RTK signal includes the steps of:

S1, acquiring operation parameter information about the caterpillar-type agricultural machinery before signal loss, and adjusting a state of the caterpillar-type agricultural machinery based on the operation parameter information, and S2, calculating an operation deviation amount after adjusting the state of the caterpillar-type agricultural machinery for a time t, and adjusting heading information about the caterpillar-type agricultural machinery based on the deviation amount until the caterpillar-type agricultural machinery returns to an original planned route to complete navigation.

Preferably, S1 includes:

S11, acquiring the operation parameter information, and determining the heading of the vehicle body based on the operation parameter information;

S12, adjusting, when the heading of the vehicle body is not deviated, velocities of the left and right wheels to be equal, and keeping the original planned route operation; and S13, adjusting, when the heading of the vehicle body deviates, velocities of the left and right wheels to be equal, and travelling along a current heading.

Preferably, S2 includes:

S21, calculating the operation deviation amount, and travelling parameters for travelling back to the original planned route when the operation deviation amount is greater than a pre-set value, and returning to the original planned route based on the travelling parameters, and S22, travelling along the current heading when the deviation amount is less than the pre-set value, and repeating S21.

Preferably, S21 includes:

S211, calculating, when the operation deviation amount is greater than the pre-set value, an arc radius required for the caterpillar-type agricultural machinery to travel back to the original planned route, S212, calculating linear velocities of left and right wheels of the caterpillar-type agricultural machinery to travel back to the original planned route, and calculating a differential velocity of the left and right wheels based on the linear velocities, and S213, calculating the time required for the caterpillar-type agricultural machinery to travel back to the original planned route, and calculating and adjusting the differential velocity of the left and right wheels in real time to realize the returning of the vehicle body to the original planned route.

Preferably, the differential velocity is adjusted by:

$$Z = \frac{A\sin^{-1}\frac{h}{s-s_1-V\cos\theta}}{\log_{10}(B|h|+e)} + \frac{C\cdot(e^{D|h|}-1)\cdot d}{|h|} + \Delta V$$

where h represents a real-time deviation distance; s is a total distance; $s_1$ is a straight-line distance traveled; V represents a traveling velocity of the caterpillar-type agricultural machinery; θ is an angle between the heading of a vehicle body and an original planned route straight line; B, C and D are constant coefficients; e represents a natural constant; d represents a deviation amount; and ΔV represents a differential velocity.

The present disclosure also provides a navigation system for caterpillar-type agricultural machinery during loss of a navigation RTK signal, applied in the above method, including: an acquisition module and a calculation module, the acquisition module being configured to acquire operation parameter information about the caterpillar-type agricultural machinery before signal loss, and adjust a state of the caterpillar-type agricultural machinery based on the operation parameter information; and the calculation module being configured to calculate an operation deviation amount after adjusting the state of the caterpillar-type agricultural machinery for a time t and adjust heading information about the caterpillar-type agricultural machinery based on the deviation amount until the caterpillar-type agricultural machinery returns to an original planned route to complete navigation.

Preferably, the acquisition module includes: a collection unit, a determination unit and an adjustment unit, the collection unit being configured to acquire the operation parameter information;

the determination unit being configured to determine the heading of the vehicle body based on the operation parameter information; and the adjustment unit being configured to adjust, when the heading of the vehicle body is not deviated, velocities of the left and right wheels to be equal and keep the original planned route operation; and adjust, when the heading of the vehicle body deviates, velocities of the left and right wheels to be equal and travel along the current heading.

Preferably, the calculation module includes: a first calculation unit and a second calculation unit, the first calculation unit being configured to calculate the operation deviation amount, and compare the operation deviation amount with the pre-set value; and the second calculation unit being configured to calculate travelling parameters for travelling back to the original planned route when the operation deviation amount is greater than the pre-set value and return to the original planned route based on the travelling parameters.

Preferably, the second calculation unit includes: a radius calculation subunit, a differential velocity calculation subunit and a differential velocity adjustment subunit, the radius calculation subunit being configured to calculate, when the operation deviation amount is greater than the pre-set value, an arc radius required for the caterpillar-type agricultural machinery travelling back to the original planned route;

the differential velocity calculation subunit being configured to calculate linear velocities of left and right wheels for the caterpillar-type agricultural machinery travelling back to the original planned route, and calculate a differential velocity of the left and right wheels based on the linear velocities; and the differential velocity adjustment subunit being configured to calculate the time required for the caterpillar-type agricultural machinery travelling back to the original planned route, and calculate and adjust the differential velocity of the left and right wheels in real time to realize the returning of the vehicle body to the original planned route.

Preferably, the differential velocity is adjusted by:

$$Z = \frac{A\sin^{-1}\frac{h}{s - s_1 - V\cos\theta}}{\log_{10}(B|h| + e)} + \frac{C \cdot (e^{D|h|} - 1) \cdot d}{|h|} + \Delta V$$

where h represents a real-time deviation distance; s is a total distance; $s_1$ is a straight-line distance traveled; V represents a traveling velocity of the caterpillar-type agricultural machinery; θ is an angle between the heading of a vehicle body and an original planned route straight line; B, C and D are constant coefficients; e represents a natural constant; d represents a deviation amount; and ΔV represents a differential velocity.

Compared with the prior art, the present disclosure has the following advantageous effects.

In the present disclosure, an operation route of agricultural machinery can be matched with the planned route after signal loss, deviation operation caused by signal loss during large-scale operation of agricultural machinery can be improved, and problems in regional scale planting can be prevented.

BRIEF DESCRIPTION OF THE DRAWINGS

In order to explain the technical solutions in the present disclosure more clearly, the attached drawings needed in the description of the examples or the prior art are briefly introduced below. Obviously, the attached drawings in the following description are only examples of the present disclosure, and other attached drawings can be obtained according to the provided drawings without creative efforts for those of ordinary skill in the art.

DETAILED DESCRIPTION

Technical solutions in examples of the present disclosure will be described clearly and completely in the following with reference to the attached drawings in the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

To make the above object, features and advantages of the present disclosure more obvious and easy to understand, in the following, the present disclosure will be further explained in detail with the attached drawings and specific examples.

Example 1

Figure 1:
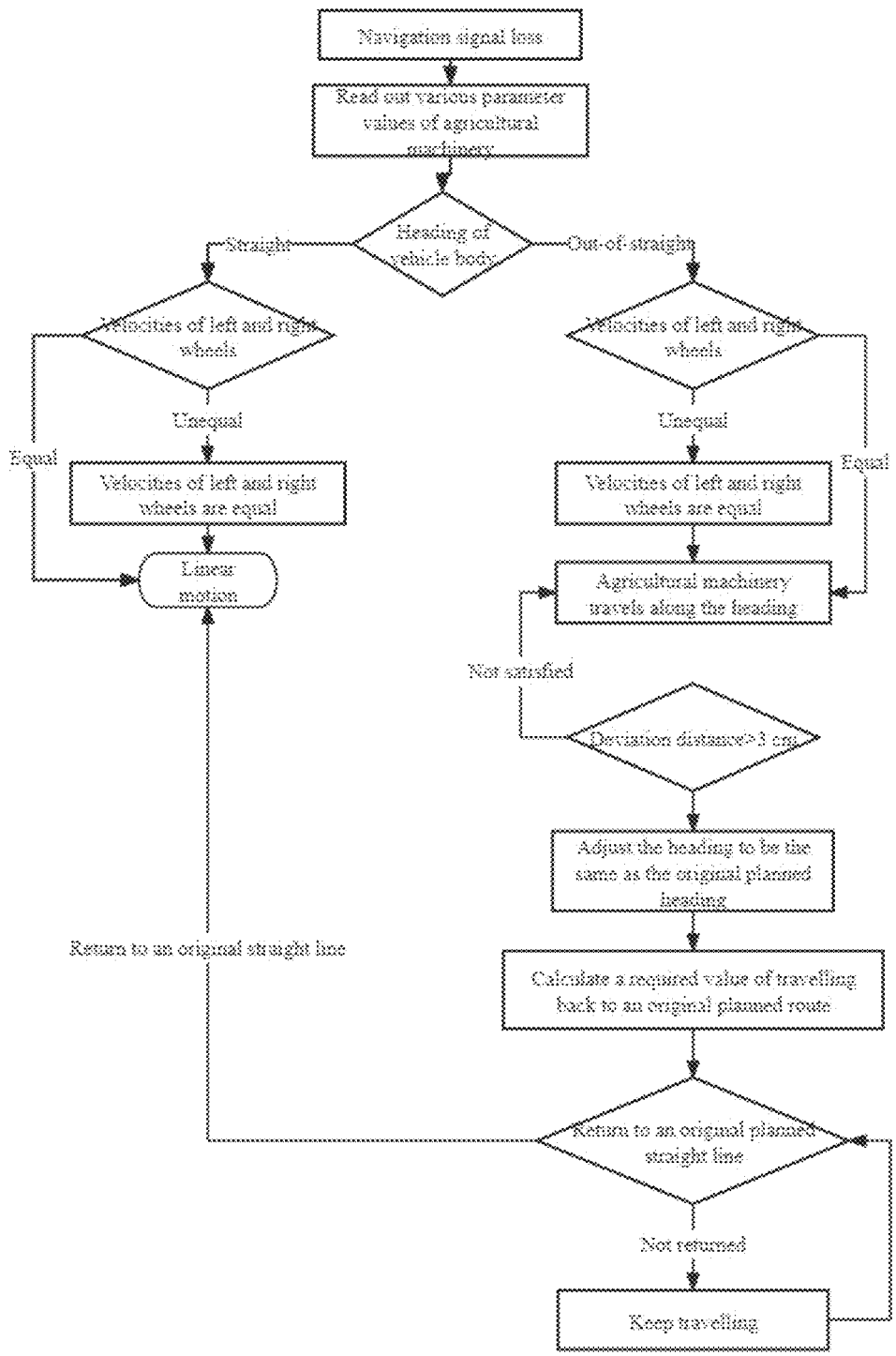
FIG. 1 is a schematic flow chart of a navigation method for caterpillar-type agricultural machinery during loss of a navigation RTK signal according to Example 1 of the present disclosure.

As shown in FIG. 1, the example provides a navigation method for caterpillar-type agricultural machinery during loss of a navigation RTK signal, including the following steps.

In S1, operation parameter information about the caterpillar-type agricultural machinery before signal loss is acquired, and a state of the caterpillar-type agricultural machinery is adjusted based on the operation parameter information. S1 further includes the following steps.

In S11, the operation parameter information is acquired, and the heading of the vehicle body is determined based on the operation parameter information.

In S12, when the heading of the vehicle body is not deviated, velocities of the left and right wheels are adjusted to be equal, and the original planned route operation is kept.

In S13, when the heading of the vehicle body deviates, velocities of the left and right wheels are adjusted to be equal, and the vehicle travels along a current heading.

Specifically, the heading information, attitude information as well as angle and velocity information of the caterpillar-type agricultural machinery before signal loss are read out. An angle between the heading of the vehicle body and an original planned route straight line is denoted as $\theta$ (when $\theta>0$, the vehicle body is deviated to the right; and when $\theta<0$, the vehicle body is deviated to the left). The velocities of the left and right wheels are denoted as $V_L$ and $V_R$ respectively. A straight-line distance traveled is denoted as $s_1$, and a total distance is denoted as s.

When $\theta$ is not $0°$ and the velocities of the left and right wheels are not equal, the travelling velocity V of the caterpillar-type agricultural machinery is adjusted to max $\{V_L, V_R\}$, and the differential velocity of the two wheels is adjusted to ensure the linear motion of the caterpillar-type agricultural machinery.

In S2, an operation deviation amount is calculated after adjusting the state of the caterpillar-type agricultural machinery for a time t, and heading information about the caterpillar-type agricultural machinery is adjusted based on the deviation amount until the caterpillar-type agricultural machinery returns to an original planned route to complete navigation. S2 includes the following steps.

Figure 2:
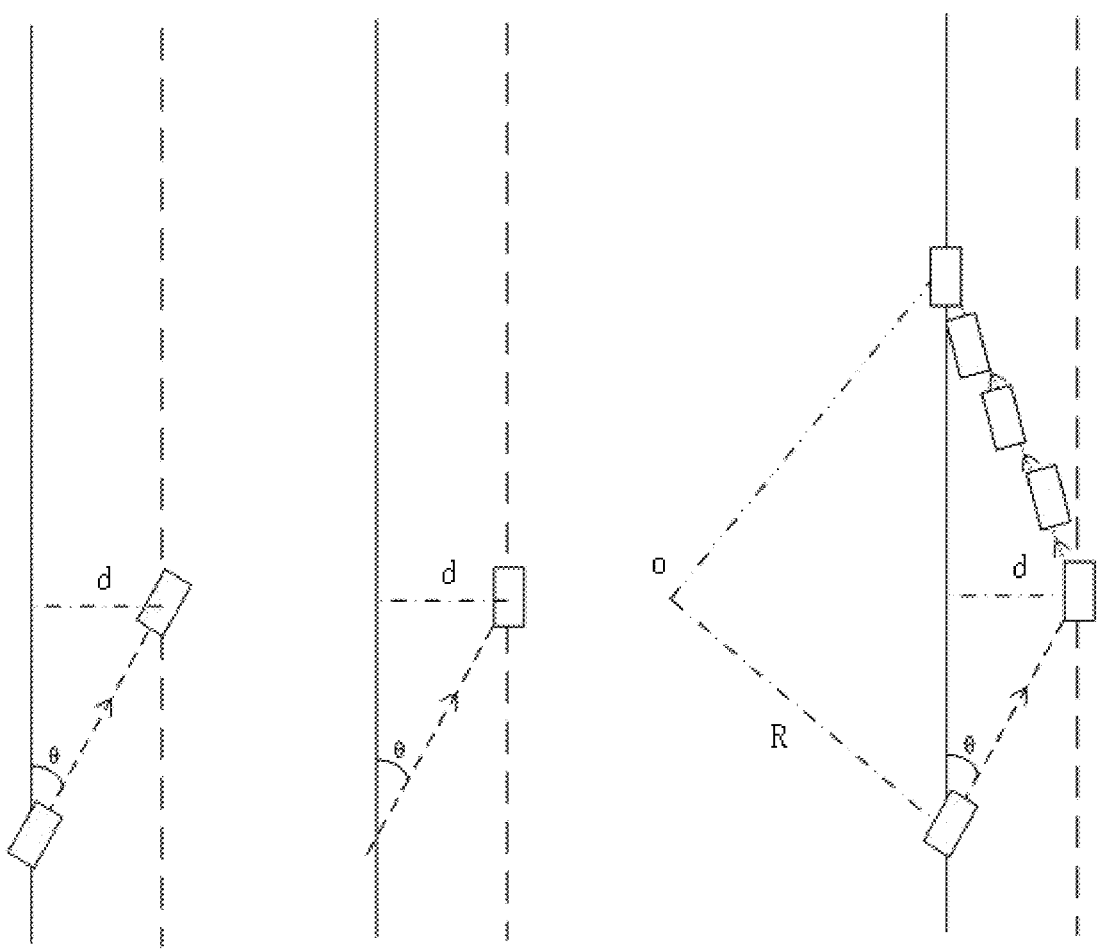
FIG. 2 is a schematic diagram of the movement of the caterpillar-type agricultural machinery according to Example 1 of the present disclosure.

In S21, the operation deviation amount is calculated, travelling parameters for travelling back to the original planned route are calculated when the operation deviation amount is greater than a pre-set value, and the original planned route is returned based on the travelling parameters. This is shown in FIG. 2.

In S211, when the operation deviation amount is greater than the pre-set value, an arc radius required for the caterpillar-type agricultural machinery travelling back to the original planned route is calculated.

A calculation method for the deviation amount d includes:

$d = Vt \cdot \sin \theta$ when d is positive, it is determined that the vehicle body is deflected to the right; and when d is negative, it is determined that the vehicle body is deviated to the left.

It is determined in real time that whether $|d|\theta$ is greater than 3 cm, and when $|d|\theta$ is greater than 3 cm, the heading information of the caterpillar-type agricultural machinery is adjusted, that is, the differential velocity of the two wheels is adjusted to complete the change in the heading information of the agricultural machinery.

Firstly, it is determined whether the vehicle body is deviated to the right or to the left, that is, whether $\theta>0$ or $\theta<0$; and when the vehicle body is deviated to the right:

$$V_L = 0$$
$$V_R = \omega \cdot \frac{L}{2}$$

where L represents a wheelbase of the left and right wheels; and $\omega$ represents an angular velocity of travelling.

When the vehicle body is deviated to the left:

$$V_R = 0$$
$$V_L = \omega \cdot \frac{L}{2}.$$

Secondly, an arc radius R required for the caterpillar-type agricultural machinery travelling back to the original planned route is calculated:

$R = Vt/2 \sin \theta.$

In S212, linear velocities of left and right wheels for the caterpillar-type agricultural machinery travelling back to the original planned route are calculated, and a differential velocity of the left and right wheels is calculated based on the linear velocities.

When a vehicle body is deviated to the right:

$$V_L = \omega \cdot \left(R - \frac{L}{2}\right)$$
$$V_R = \omega \cdot \left(R + \frac{L}{2}\right).$$

When the vehicle body is deviated to the left:

$$V_R = \omega \cdot \left(R - \frac{L}{2}\right)$$
$$V_L = \omega \cdot \left(R + \frac{L}{2}\right)$$

the differential velocity of the left and right wheels of the caterpillar-type agricultural machinery is:

$\Delta V = V_R - V_L.$

In S213, the time required for the caterpillar-type agricultural machinery travelling back to the original planned route is calculated, and the differential velocity of the left and right wheels is calculated and adjusted in real time to realize the returning of the vehicle body to the original planned route.

To calculate the time $t_1$ required for the caterpillar-type agricultural machinery travelling back to the original planned route, many factors such as the mass of the caterpillar-type agricultural machinery, the ground friction force and the actual power transmission difference between caterpillar bands need to be considered. Multiple calculations of the differential velocity of two wheels of the agricultural machinery are required to adjust the caterpillar-type agricultural machinery to travel to the original planned route, and ensure that when the vehicle body returns to the original planned route, the heading information is the same as the planned straight line.

$$t_1 = \frac{2\theta}{\omega}$$
$$s_2 = R \cdot \frac{|Z|}{\omega} \cdot \frac{t_1}{n}$$
$$h = d - \sqrt{R^2 - (R - s_2)^2}$$

-continued $$Z = \frac{A\sin^{-1}\frac{h}{s-s_1-V\cos\theta}}{\log_{10}(B|h|+e)} + \frac{C\cdot(e^{D|h|}-1)\cdot d}{|h|} + \Delta V$$

where $s_2$ is an arc length traveled by the caterpillar-type agricultural machinery after adjustment once; Z is a parameter for adjusting the differential velocity of the left and right wheels, turning left when Z>0 and turning right when Z<0; n represents the number of real-time calculations; h represents a real-time deviation distance; e represents a natural constant; and A, B, C and D are constant coefficients, and are adjusted according to a mass of the caterpillar-type agricultural machinery, the ground friction force and the actual power transmission difference between caterpillar bands.

In S22, the vehicle travels along a current heading when the deviation amount is less than the pre-set value, the deviation amount is calculated in real time, and when the deviation amount is greater than the pre-set value, S21 is repeated.

Finally, after the caterpillar-type agricultural machinery is adjusted in the differential velocity and travels for the time $t_1$, the differential velocity of two wheels is adjusted to $V_L=V_R$, keeping the linear motion.

In summary, after a signal of the caterpillar-type agricultural machinery is lost for (t+$t_1$), the control of the agricultural machinery is completed, the autonomous navigation travel of the agricultural machinery after the signal is lost is realized, and the problem of the operation route deviation or work stopping on the agricultural machinery due to the navigation signal loss is solved.

Example 2

In the example, a field trial is provided. Caterpillar-type harvesters at Qingdao Hongzhu planting base are employed. Field comparative trials are conducted on the improved and unimproved equipment. The comparison trial is carried out on two adjacent ridges in the same plot. At the beginning, the linear path planning of respective travelling ridges is carried out for two sets of equipment at the same time. After the caterpillar-type harvesters travel under the RTK signal for a period of time, the RTK signal is manually blocked, and the travelling trajectories of the two caterpillar-type harvesters are observed to determine the feasibility of this method.

Figure 3:
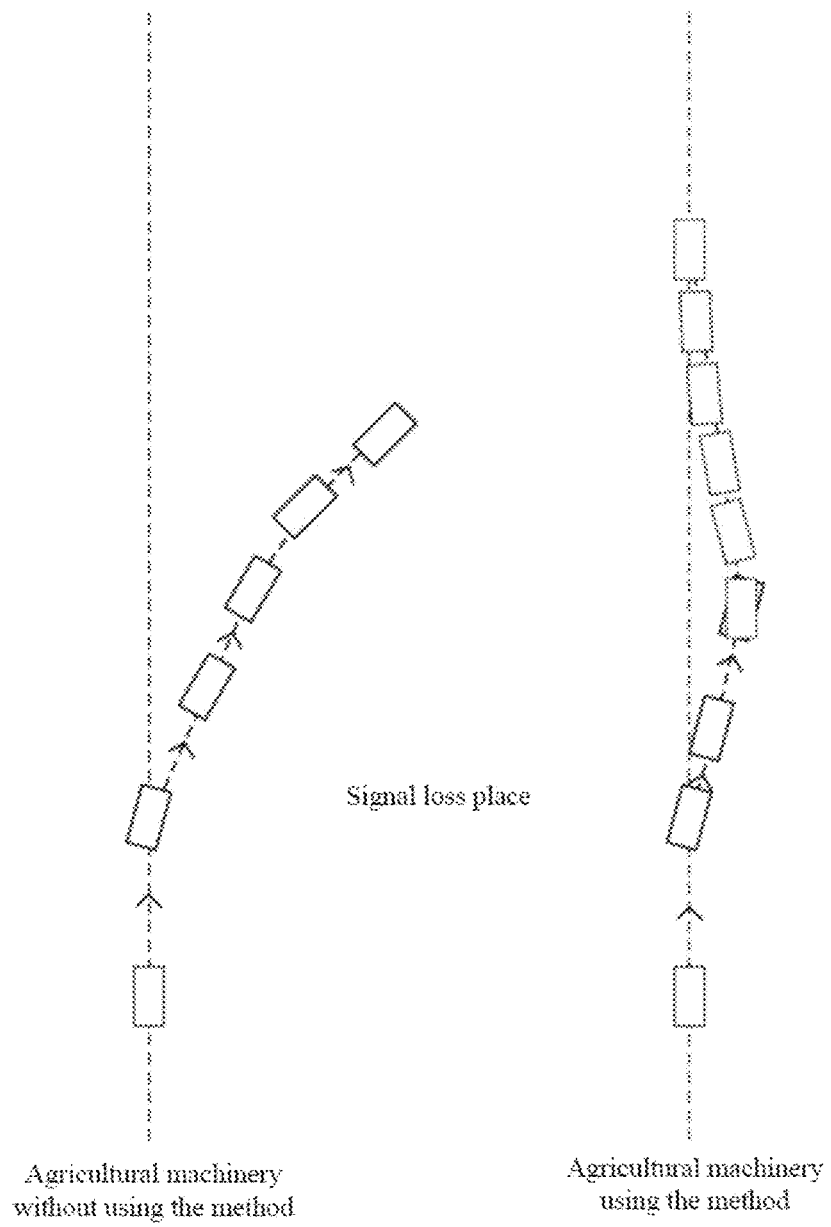
FIG. 3 is a schematic diagram of a travelling trajectory according to Example 2 of the present disclosure.

As shown in FIG. 3, a harvester deviating from the original planned route can be returned to the original planned route using the method proposed by the present disclosure.

Figure 4:
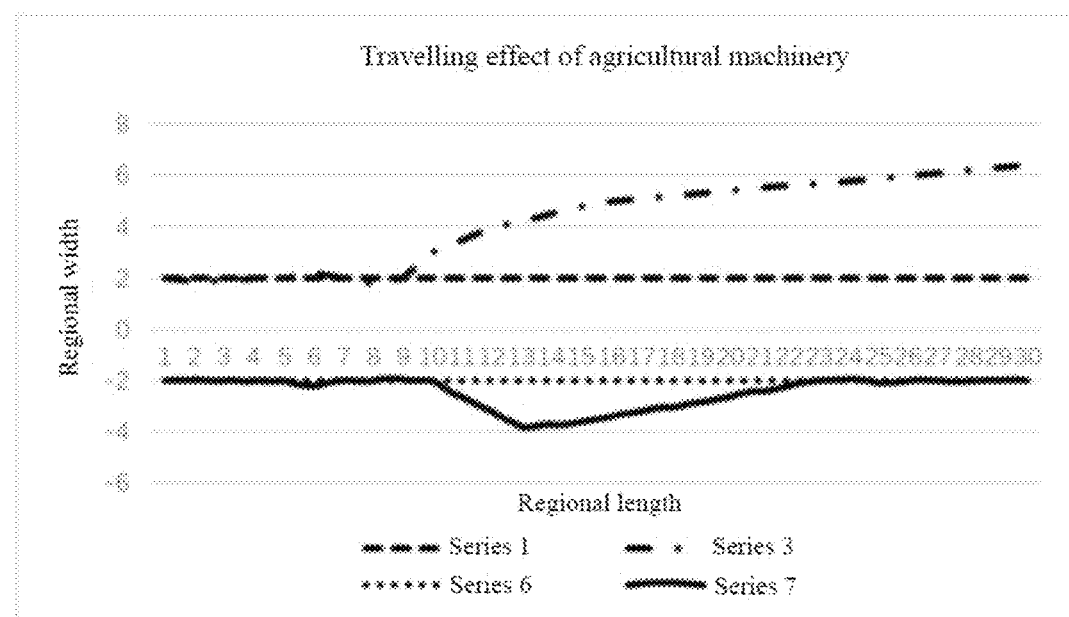
FIG. 4 is a schematic diagram of the effect according to Example 2 of the present disclosure.

As shown in FIG. 4, Series 1 and Series 6 are planned travelling route for a caterpillar-type harvester, Series 3 is the travelling effect obtained without using the navigation control method of the present disclosure, and Series 7 is the travelling effect of a caterpillar-type harvester obtained using the navigation method of the present disclosure.

Figure 5:
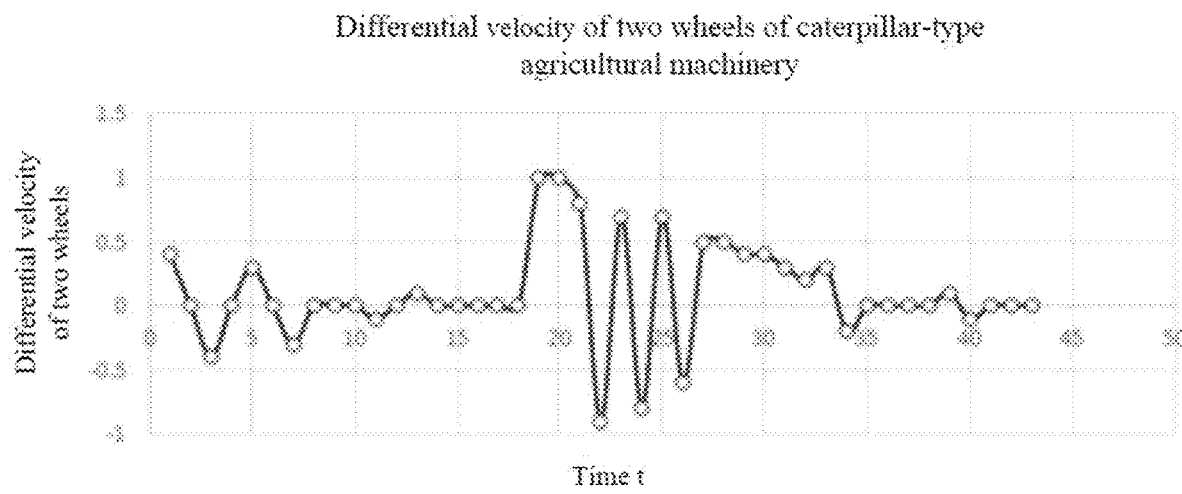
FIG. 5 is a schematic diagram of differential velocities of left and right wheels according to Example 2 of the present disclosure.

FIG. 5 is a schematic diagram of a differential velocity of left and right wheels. It can be seen from the travelling trajectory and travelling effect diagram of the above caterpillar-type harvester that after the navigation RTK signal is lost, the caterpillar-type harvester added with the navigation method can return to the original planned route after a period of travel, but a caterpillar-type harvester without the navigation method cannot. Therefore, the caterpillar-type harvester added with the navigation method operates more completely after the navigation RTK signal is lost, without deviation.

Example 3

In the example, a navigation system for caterpillar-type agricultural machinery during loss of a navigation RTK signal is provided, including: an acquisition module and a calculation module.

The acquisition module is configured to acquire operation parameter information about the caterpillar-type agricultural machinery before signal loss and adjust a state of the caterpillar-type agricultural machinery based on the operation parameter information; and the acquisition module includes: a collection unit, a determination unit and an adjustment unit.

The collection unit is configured to acquire the operation parameter information.

The heading information, attitude information as well as angle and velocity information of the caterpillar-type agricultural machinery before the signal is lost are read out. An angle between the heading of the vehicle body and the original planned route straight line is denoted as θ. The velocities of the left and right wheels are denoted as $V_L$ and $V_R$ respectively. A straight-line distance traveled is denoted as $s_1$, and a total distance is denoted as s.

The determination unit is configured to determine the heading of the vehicle body based on the operation parameter information.

When θ>0, it is determined that the vehicle body is deviated to the right; and when θ<0, it is determined that the vehicle body is deviated to the left.

The adjustment unit is configured to adjust, when the heading of the vehicle body is not deviated, velocities of the left and right wheels to be equal and keep the original planned route operation; and adjust, when the heading of the vehicle body deviates, velocities of the left and right wheels to be equal and travel along the current heading.

When θ is not 0° and the velocities of the left and right wheels are not equal, the travelling velocity V of the caterpillar-type agricultural machinery is adjusted to max $\{V_L, V_R\}$, and the differential velocity of the two wheels is adjusted to ensure the linear motion of the caterpillar-type agricultural machinery.

The calculation module is configured to calculate an operation deviation amount after adjusting the state of the caterpillar-type agricultural machinery for a time t and adjust heading information about the caterpillar-type agricultural machinery based on the deviation amount until the caterpillar-type agricultural machinery returns to an original planned route to complete navigation. The calculation module includes: a first calculation unit and a second calculation unit.

The first calculation unit is configured to calculate the operation deviation amount, and compare the operation deviation amount with the pre-set value.

A calculation method of the deviation amount d includes:

$$d = Vt\cdot\sin\theta$$

when d is positive, it is determined that the vehicle body is deviated to the right; and when d is negative, it is determined that the vehicle body is deviated to the left.

It is determined in real time that whether |d|θ is greater than 3 cm, and when |d|θ is greater than 3 cm, the heading information of the caterpillar-type agricultural machinery is adjusted, that is, the differential velocity of the two wheels is adjusted to complete the change of the heading information of the agricultural machinery.

The second calculation unit is configured to calculate travelling parameters for travelling back to the original planned route when the operation deviation amount is greater than the pre-set value and return to the original planned route based on the travelling parameters. The second calculation unit includes: a radius calculation subunit, a differential velocity calculation subunit and a differential velocity adjustment subunit.

The radius calculation subunit is configured to calculate, when the operation deviation amount is greater than the pre-set value, an arc radius required for the caterpillar-type agricultural machinery travelling back to the original planned route.

Firstly, it is determined whether the vehicle body is deviated to the right or to the left, that is, whether θ>0 or θ<0; and when the vehicle body is deviated to the right:

$$V_L = 0$$

$$V_R = \omega \cdot \frac{L}{2}$$

where L represents a wheelbase of the left and right wheels; and w represents an angular velocity of travelling.

When the vehicle body is deviated to the left:

$$V_R = 0$$

$$V_L = \omega \cdot \frac{L}{2}.$$

Secondly, an arc radius R required for the caterpillar-type agricultural machinery travelling back to the original planned route is calculated:

$$R = Vt/2 \sin \theta.$$

The differential velocity calculation subunit is configured to calculate linear velocities of left and right wheels for the caterpillar-type agricultural machinery travelling back to the original planned route and calculate a differential velocity of the left and right wheels based on the linear velocities.

When a vehicle body is deviated to the right:

$$V_L = \omega \cdot \left(R - \frac{L}{2}\right)$$

$$V_R = \omega \cdot \left(R + \frac{L}{2}\right).$$

When the vehicle body is deviated to the left:

$$V_R = \omega \cdot \left(R - \frac{L}{2}\right)$$

$$V_L = \omega \cdot \left(R + \frac{L}{2}\right)$$

the differential velocity of the left and right wheels of the caterpillar-type agricultural machinery is:

$$\Delta V = V_R - V_L.$$

The differential velocity adjustment subunit is configured to calculate the time required for the caterpillar-type agricultural machinery travelling back to the original planned route and calculate and adjust the differential velocity of the left and right wheels in real time to realize the returning of the vehicle body to the original planned route.

To calculate the time $t_1$ required for the caterpillar-type agricultural machinery travelling back to the original planned route, many factors such as the mass of the caterpillar-type agricultural machinery, the ground friction force and the actual power transmission difference between caterpillar bands need to be considered. Multiple calculations of the differential velocity of two wheels of the agricultural machinery are required to adjust the caterpillar-type agricultural machinery to travel to the original planned route, and ensure that when the vehicle body returns to the original planned route, the heading information is the same as the planned straight line.

$$t_1 = \frac{2\theta}{\omega}$$

$$s_2 = R \cdot \frac{|Z|}{\omega} \cdot \frac{t_1}{n}$$

$$h = d - \sqrt{R^2 - (R - s_2)^2}$$

$$Z = \frac{A \sin^{-1} \frac{h}{s - s_1 - V\cos\theta}}{\log_{10}(B|h| + e)} + \frac{C \cdot (e^{D|h|} - 1) \cdot d}{|h|} + \Delta V$$

where $s_2$ is an arc length traveled by the caterpillar-type agricultural machinery after adjustment once; Z is a parameter for adjusting the differential velocity of the left and right wheels, turning left when Z>0 and turning right when Z<0; n represents the number of real-time calculations; h represents a real-time deviation distance; e represents a natural constant; and A, B, C and D are constant coefficients, and are adjusted according to a mass of the caterpillar-type agricultural machinery, the ground friction force and the actual power transmission difference between caterpillar bands.

Finally, after the caterpillar-type agricultural machinery is adjusted in the differential velocity and travels for the time $t_1$, the differential velocity of two wheels is adjusted to $V_L = V_R$, keeping the linear motion.

The above-mentioned example is only the description of the preferred mode of the present disclosure and does not limit the scope of the present disclosure. Under the premise of not departing from the design spirit of the present disclosure, various modifications and improvements made by those of ordinary skill in the art to the technical solutions of the present disclosure fall within the protection scope determined by the claims of the present disclosure.

The invention claimed is:

1. A navigation method for caterpillar-type agricultural machinery during loss of a navigation real-time kinematic (RTK) signal, comprising the steps of:
   S1, acquiring operation parameter information about the caterpillar-type agricultural machinery before signal loss, and adjusting a state of the caterpillar-type agricultural machinery based on the operation parameter information, and
   S2, calculating an operation deviation amount after adjusting the state of the caterpillar-type agricultural machinery for a time t, and adjusting heading information about the caterpillar-type agricultural machinery based on the deviation amount until the caterpillar-type agricultural machinery returns to an original planned route to complete navigation,
   S2 comprising:
   S21, calculating the operation deviation amount, and travelling parameters for travelling back to the original planned route when the operation deviation amount is greater than a pre-set value, and returning to the original planned route based on the travelling parameters, S21 comprising:

S211, calculating, when the operation deviation amount is greater than the pre-set value, an arc radius required for the caterpillar-type agricultural machinery to travel back to the original planned route, S212, calculating linear velocities of left and right wheels of the caterpillar-type agricultural machinery to travel back to the original planned route, and calculating a differential velocity of the left and right wheels based on the linear velocities, when a vehicle body is deviated to the right:

$$V_L = \omega \cdot \left(R - \frac{L}{2}\right)$$

$$V_R = \omega \cdot \left(R + \frac{L}{2}\right)$$

where $V_L$ and $V_R$ are velocities of the left and right wheels, respectively; R represents an arc radius; L represents a wheelbase of the left and right wheels; and w represents an angular velocity of travelling;

when the vehicle body is deviated to the left:

$$V_R = \omega \cdot \left(R - \frac{L}{2}\right)$$

$$V_L = \omega \cdot \left(R + \frac{L}{2}\right)$$

the differential velocity of the left and right wheels being:

$\Delta V = V_R - V_L$; and

S213, calculating the time required for the caterpillar-type agricultural machinery to travel back to the original planned route, and calculating and adjusting the differential velocity of the left and right wheels in real time to realize the returning of the vehicle body to the original planned route, $$t_1 = \frac{2\theta}{\omega}$$

$$s_2 = R \cdot \frac{|Z|}{\omega} \cdot \frac{t_1}{n}$$

$$h = d - \sqrt{R^2 - (R - s_2)^2}$$

$$Z = \frac{A\sin^{-1}\frac{h}{s - s_1 - V\cos\theta}}{\log_{10}(B|h| + e)} + \frac{C \cdot (e^{D|h|} - 1) \cdot d}{|h|} + \Delta V$$

where θ is an angle between the heading of a vehicle body and an original planned route straight line; S2 is an arc length traveled by the caterpillar-type agricultural machinery after adjustment once; Z is a parameter for adjusting the differential velocity of the left and right wheels, turning left when Z>0 and turning right when Z<0; n represents the number of real-time calculations; h represents a real-time deviation distance; e represents a natural constant; A, B, C and D are constant coefficients, and are adjusted according to a mass of the caterpillar-type agricultural machinery, the ground friction force and the actual power transmission difference between caterpillar bands; d represents a deviation amount; S1 is a straight-line distance traveled; and s is a total distance; and S22, travelling along a current heading when the deviation amount is less than the pre-set value, and repeating S21.

2. The navigation method for caterpillar-type agricultural machinery during loss of a navigation RTK signal according to claim 1, wherein S1 comprises:

S11, acquiring the operation parameter information, and determining the heading of a vehicle body based on the operation parameter information;

S12, adjusting, when the heading of the vehicle body is not deviated, velocities of left and right wheels to be equal, and keeping the original planned route operation; and S13, adjusting, when the heading of the vehicle body deviates, velocities of the left and right wheels to be equal, and travelling along the current heading.

3. A navigation system for caterpillar-type agricultural machinery during loss of a navigation RTK signal, applied in the method according to claim 1, comprising: an acquisition module and a calculation module, the acquisition module being configured to acquire operation parameter information about the caterpillar-type agricultural machinery before signal loss, and adjust a state of the caterpillar-type agricultural machinery based on the operation parameter information; and the calculation module being configured to calculate an operation deviation amount after adjusting the state of the caterpillar-type agricultural machinery for a time t and adjust heading information about the caterpillar-type agricultural machinery based on the deviation amount until the caterpillar-type agricultural machinery returns to an original planned route to complete navigation.

4. A navigation system for caterpillar-type agricultural machinery during loss of a navigation RTK signal, applied in the method according to claim 2, comprising: an acquisition module and a calculation module, the acquisition module being configured to acquire operation parameter information about the caterpillar-type agricultural machinery before signal loss, and adjust a state of the caterpillar-type agricultural machinery based on the operation parameter information; and the calculation module being configured to calculate an operation deviation amount after adjusting the state of the caterpillar-type agricultural machinery for a time t and adjust heading information about the caterpillar-type agricultural machinery based on the deviation amount until the caterpillar-type agricultural machinery returns to an original planned route to complete navigation.

5. The navigation system for caterpillar-type agricultural machinery during loss of a navigation RTK signal according to claim 3, wherein the acquisition module comprises: a collection unit, a determination unit and an adjustment unit, the collection unit being configured to acquire the operation parameter information;

the determination unit being configured to determine the heading of the vehicle body based on the operation parameter information; and the adjustment unit being configured to adjust, when the heading of the vehicle body is not deviated, velocities of the left and right wheels to be equal and keep the original planned route operation; and adjust, when the heading of the vehicle body deviates, velocities of the left and right wheels to be equal and travel along the current heading.

6. The navigation system for caterpillar-type agricultural machinery during loss of a navigation RTK signal according to claim 3, wherein the calculation module comprises: a first calculation unit and a second calculation unit,
- the first calculation unit being configured to calculate the operation deviation amount, and compare the operation deviation amount with the pre-set value; and
- the second calculation unit being configured to calculate travelling parameters for travelling back to the original planned route when the operation deviation amount is greater than a pre-set value and return to the original planned route based on the travelling parameters.

7. The navigation system for caterpillar-type agricultural machinery during loss of a navigation RTK signal according to claim 6, wherein the second calculation unit comprises: a radius calculation subunit, a differential velocity calculation subunit and a differential velocity adjustment subunit,
- the radius calculation subunit being configured to calculate, when the operation deviation amount is greater than the pre-set value, an arc radius required for the caterpillar-type agricultural machinery to travel back to the original planned route;
- the differential velocity calculation subunit being configured to calculate linear velocities of left and right wheels of the caterpillar-type agricultural machinery to travel back to the original planned route, and calculate a differential velocity of the left and right wheels based on the linear velocities; and
- the differential velocity adjustment subunit being configured to calculate the time required for the caterpillar-type agricultural machinery to travel back to the original planned route and calculate and adjust the differential velocity of the left and right wheels in real time to realize the returning of the vehicle body to the original planned route.

* * * * *